Figure 1:
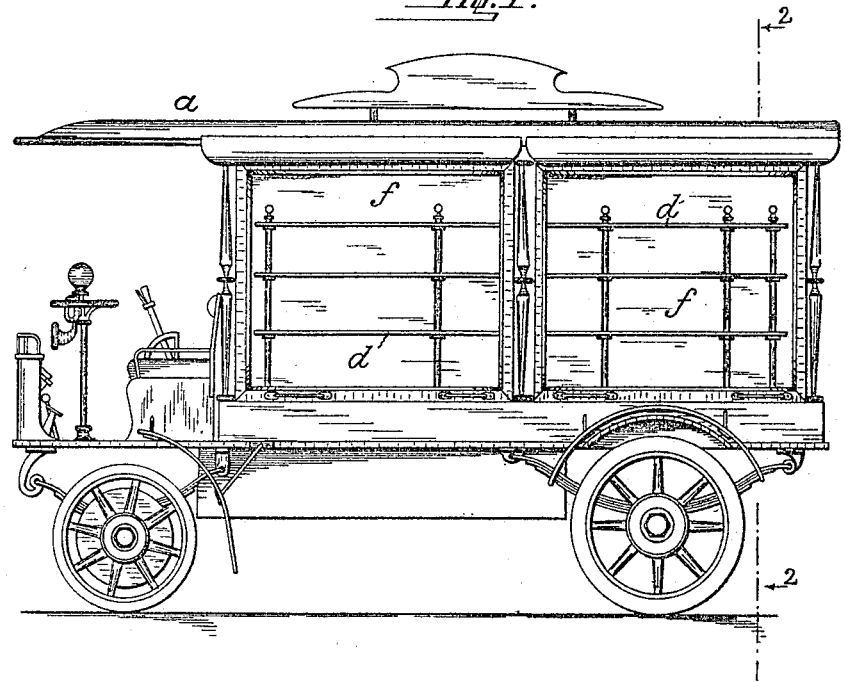

No. 807,948. PATENTED DEC. 19, 1905.
E. LEFÈVRE.
VEHICLE FOR EXHIBITING GOODS.
APPLICATION FILED APR. 13, 1905.

3 SHEETS—SHEET 1.

WITNESSES:
W. M. Averit
H. H. Davis

INVENTOR
Emil Lefèvre
BY
Munn
ATTORNEYS

No. 807,948. PATENTED DEC. 19, 1905.
E. LEFÈVRE.
VEHICLE FOR EXHIBITING GOODS.
APPLICATION FILED APR. 13, 1905.
3 SHEETS—SHEET 2.
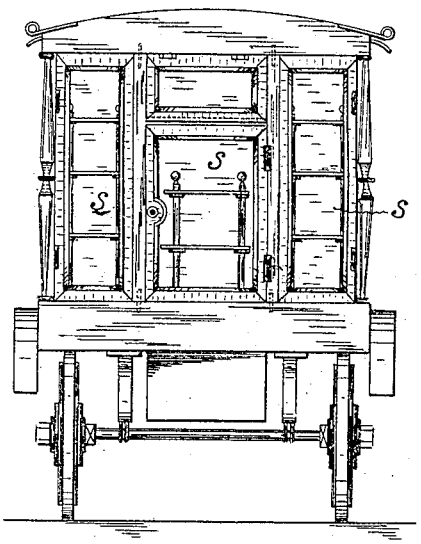
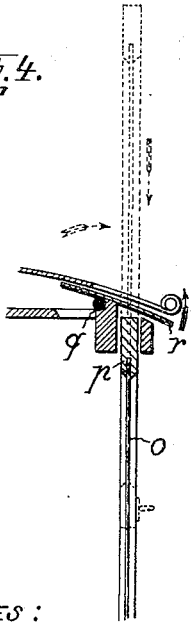
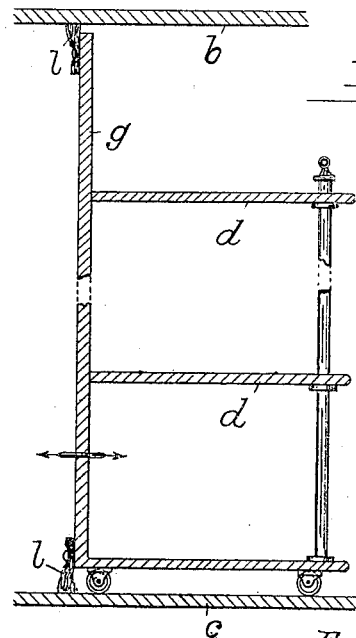
WITNESSES:
W. M. Avery
A. E. Davis
INVENTOR
Emil Lefèvre
BY
[signature]
ATTORNEYS No. 807,948. PATENTED DEC. 19, 1905.
E. LEFÈVRE.
VEHICLE FOR EXHIBITING GOODS.
APPLICATION FILED APR. 13, 1905.

3 SHEETS—SHEET 3.

WITNESSES:
W. M. Avery
A. E. Davis

INVENTOR
Emil Lefèvre
BY
ATTORNEYS

UNITED STATES PATENT OFFICE.

EMIL LEFÈVRE, OF BERLIN, GERMANY.

VEHICLE FOR EXHIBITING GOODS.

No. 807,948.           Specification of Letters Patent.           Patented Dec. 19, 1905.

Application filed April 13, 1905. Serial No. 255,294.

*To all whom it may concern:*

Be it known that I, ÉMIL LEFÈVRE, a subject of the King of Prussia, German Emperor, residing in the city of Berlin, in the Kingdom of Prussia, German Empire, have invented certain new and useful Improvements in Vehicles with Means for Exhibiting Goods, of which the following is a clear, full, and exact description.

The subject-matter of my present application relates to a vehicle the interior space of which is divided by means of partitions in such a way that spaces or compartments are formed which are visible from outside, said spaces or compartments being situated at the sides or ends of the vehicle, which are furnished with glass. Said spaces or compartments are intended to be utilized as show-windows and to be dressed with exhibits of any suitable kind whatever. With this object in view suitable devices—such as stands, supports, and the like—may be arranged in these show-windows upon which goods to be displayed are placed. It is, however, not necessary to use the vehicle merely for purposes of exhibition. The vehicle may also serve other purposes—for example, it may be utilized for the transport of goods which are intended to be despatched. These goods are suitably placed in a central space situated between the show-windows, said space preferably not being exposed to view from without. In this case it is generally to be recommended to divide the vehicle practically into three spaces or compartments running in the longitudinal direction of the same. The middle space is intended to be filled with the goods to be despatched. In order to render the same possible in case the quantity of goods varies, the walls which bound or limit middle space in the longitudinal direction of the vehicle are arranged to be displaceable. By means of this arrangement and according as it proves necessary to form a large or small middle space in correspondence with the quantity of goods to be despatched said walls or partitions can be moved away from one another, and consequently each of said walls or partitions can be moved toward the adjacent side of the vehicle, or said walls or partitions can be caused to approach one another. Upon the displaceable dividing-walls there are arranged devices which allow articles which have nothing to do with the goods accommodated in the middle space of the vehicle to be displayed in an attractive manner. In order to enable these show objects to be viewed from outside, the exterior longitudinal sides of the vehicle are replaced in a well-known manner by plate-glass or the like. By this arrangement the vehicle is at both sides converted into a traveling show-window, and this is effected without it being prevented in the least from fulfilling its ordinary proper functions, for if considerable quantities of despatch-goods are present the two show-spaces are made narrower or smaller by simply shifting the intermediate walls or partitions, and in exceptional cases there is nothing to prevent the said displaceable walls or partitions from being withdrawn entirely from the vehicle and the whole of the interior space of the same from being filled up with despatch-goods or from being employed in another way.

The above-described arrangement can obviously be provided in vehicles of all sorts, even hand-vehicles. The arrangement is consequently in no way confined to vehicles drawn by animals or to vehicles operated by mechanical power.

One embodiment of the invention is represented, by way of example, in the accompanying drawings.

Figure 2:
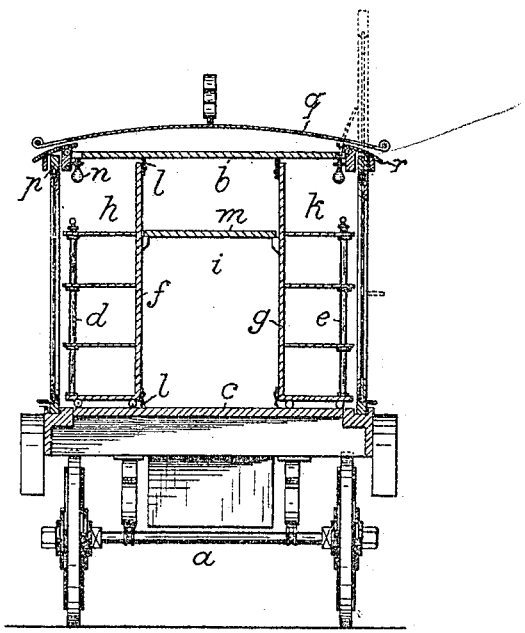
Figure 6:
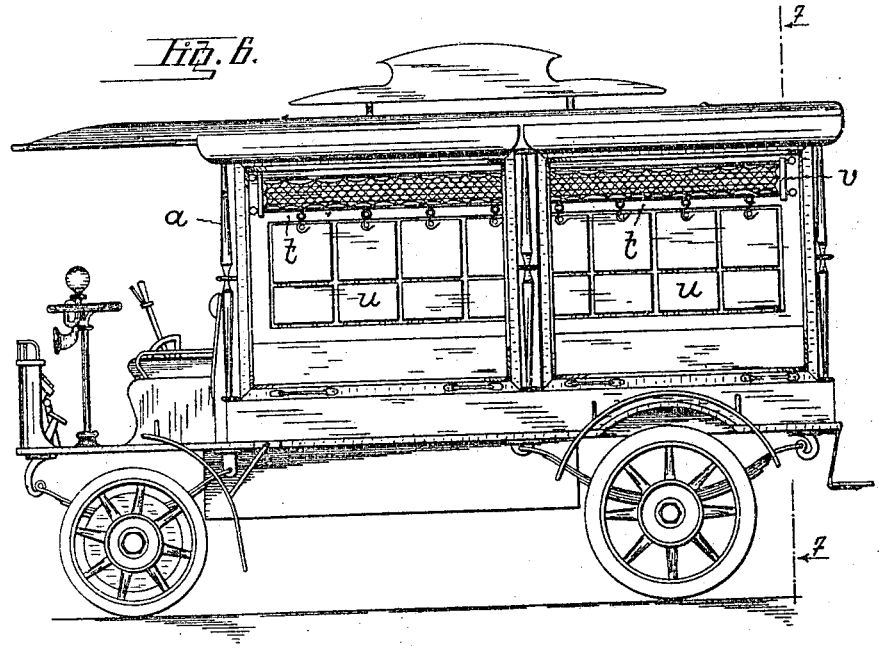
Figure 7:
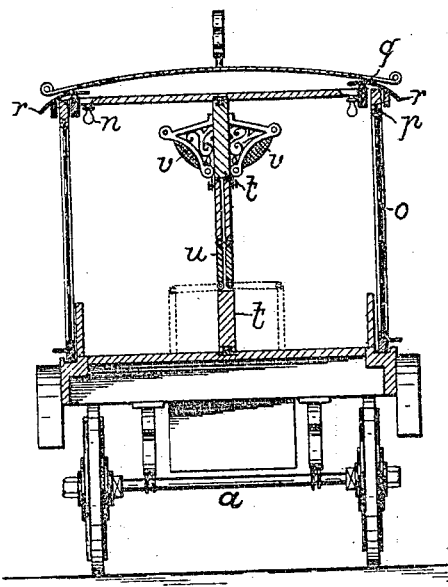

Figure 1 is a side view of a vehicle constructed according to my present invention. Fig. 2 is a vertical cross-section taken on the line 2 2 of Fig. 1. Fig. 3 is a front elevation of the vehicle. Fig. 4 is a vertical cross-section, in an enlarged scale, of a detail. Fig. 5 is a vertical cross-section, in an enlarged scale, of another detail. Fig. 6 is a side view of another vehicle embodying my invention. Fig. 7 is a vertical cross-section taken on the line 7 7 of Fig. 6.

In all figures similar letters of reference indicate corresponding parts.

The vehicle $a$, (shown in Figs. 1 to 3,) which is intended to be driven by means of electrical energy, is provided with a hollow roof, which, as shown in Fig. 2, consists of an upper cover and a lower cover $b$.

$c$ is the bottom of the vehicle. Between the lower cover $b$ and the bottom $c$ two traveling frames $d$ and $e$ are arranged, which possess back walls $f$ and $g$, respectively. The latter extend throughout the length of the interior of the vehicle, and consequently divide the same into three compartments $h$, $i$, and $k$. In order to shut off these compartments mutually from one another in a dust-tight manner, strips of felt, rubber, or the like are attached above and below on the walls $f$ and $g$, said strips lying tightly against the cover $b$ and the bottom $c$.

The compartment $i$, serving for the reception of the despatch-goods, can be subdivided by a shelf $m$, which mutually stiffens the walls $f$ and $g$. Illuminating means, such as electric lamps $n$, any number of which may be present and any suitable arrangement of which may be adopted, serve when it is dark to brilliantly illuminate the exhibited articles and the whole vehicle. The plate-glass $o$, through which the compartments $h$ and $k$ and their contents can be seen from without, is put with elastic packing in frames $p$, which can be displaced vertically by hand or by means of a suitable hoisting device, which may be operated, for example, by means of a crank. By this means it is rendered possible to dress the frames $d$ and $e$ with articles or to remove the latter from the same and to decorate the intermediate walls $f$ and $g$ without it being necessary to enter the interior of the vehicle or to displace the frames, which might, of course, be dispensed with. As the frames $p$ must for this purpose pass through the vehicle-roof in the case of the embodiment represented, it is necessary for a guard to be provided in conjunction with the slot through which the frame passes, in order that it may be impossible for water to run from the roof through said slot into the interior of the vehicle. For this purpose a gutter $r$, which is revoluble on hinges $c$, is employed in the present case. Said gutter is raised automatically as soon as the corresponding frame $p$ is lifted and sinks again when the lowering of the frame takes place. (See Figs 2 and 4.)

Small show-windows $s$ may, if desired, be arranged at the back of the vehicle and may be secured, as also the plate-glass $o$, by means of jalousies or the like in the case that vehicle is out of use to avoid damage of the plate-glass.

As soon as the frames $g$ and $e$, with the intermediate walls $f$ and $g$, are withdrawn from the vehicle, which can easily be effected through the door at the back of the vehicle, or, if desired, from the front of the same, the interior space is available for any desired purpose. Thus the same can, for example, be made suitable for the conveyance of passengers by introducing a middle partition $t$ on rails sunk in the cover $b$ and the bottom $c$. This partition is suitably provided with turn-down seats $u$ and package-racks, package-nets $v$, or the like. This arrangement increases to an extraordinary extent the value of the vehicle by increasing its serviceability, one reason among others being that the vehicle can on those days on which it is not required for the transport of goods be employed for the conveyance of passengers.

Having now particularly described and ascertained the nature of my said invention and in what manner the same is performed, I declare that what I claim is—

1. A vehicle which is divided into longitudinal compartments by means of partitions running parallel to its transparent longitudinal walls, of which the two exterior compartments are dressed with exhibits, characterized by the partitions which run parallel to the longitudinal axis of the vehicle being displaceable and so allowing the breadth of the separate compartments of the vehicle to be varied as required.

2. A vehicle provided with transparent outer walls, and a plurality of partitions running longitudinally of the vehicle and parallel with the walls, the partitions being transversely displaceable whereby the breadth of the compartments formed in the partitions may be varied, and awnings attached to the sides of the vehicle.

3. A vehicle, characterized by the partitions which run parallel to the longitudinal axis of the vehicle being displaceable and so allowing the breadth of the separate compartments of the vehicle to be varied as required.

In witness whereof I have hereunto signed my name, this 15th day of March, 1905, in the presence of two subscribing witnesses.

EMIL LEFÈVRE.

Witnesses:
 FRANZ SCHWENTERLEY,
 WOLDEMAR HAUPT.